(12) United States Patent
Blumer et al.

(10) Patent No.: US 9,170,982 B2
(45) Date of Patent: Oct. 27, 2015

(54) MACHINERY FINGERPRINTING

(71) Applicant: Vehcon, Inc., Atlanta, GA (US)

(72) Inventors: Frederick T. Blumer, Atlanta, GA (US); Joseph R. Fuller, Mableton, GA (US)

(73) Assignee: Vehcon, Inc., Atlanta, GA (US)

( * ) Notice: Subject to any disclaimer, the term of this patent is extended or adjusted under 35 U.S.C. 154(b) by 209 days.

(21) Appl. No.: 13/764,248

(22) Filed: Feb. 11, 2013

(65) Prior Publication Data

US 2013/0211662 A1 Aug. 15, 2013

Related U.S. Application Data

(60) Provisional application No. 61/596,790, filed on Feb. 9, 2012.

(51) Int. Cl.
*G06F 17/00* (2006.01)
*G06Q 30/02* (2012.01)
*G06Q 50/30* (2012.01)
*G06K 9/00* (2006.01)

(52) U.S. Cl.
CPC ............ *G06F 17/00* (2013.01); *G06Q 30/0201* (2013.01); *G06Q 50/30* (2013.01); *G06K 9/00536* (2013.01)

(58) Field of Classification Search
CPC ........... G01M 17/00; G06F 17/00; G07C 5/00
USPC ............... 701/29.1, 29.6, 32.3, 33.3, 33.4, 36
See application file for complete search history.

(56) References Cited

U.S. PATENT DOCUMENTS

2010/0097178 A1* 4/2010 Pisz et al. .................... 340/5.72

* cited by examiner

*Primary Examiner* — Kim T Nguyen
(74) *Attorney, Agent, or Firm* — Thomas|Horstemeyer, LLP

(57) ABSTRACT

Disclosed are various embodiments for a fingerprinting application. Data and optionally additional metadata for an operational automobile are captured by an application executed on a mobile device inside the automobile. An fingerprinting application matches the data to known data profiles to confirm the identity or type of the automobile. Diagnostics of the automobile can be determined by variations in the data with respect to a defined standard. The data can include one or more of audio data, accelerometer data, vibration, data and orientation data.

20 Claims, 4 Drawing Sheets

MACHINERY FINGERPRINTING

PRIORITY INFORMATION

This application claims the benefit of and priority from U.S. Provisional Application 61/596,790, "Acoustic Fingerprinting for Machinery Identification, Evaluation, and Operator Characteristics," which is hereby incorporated by reference in its entirety, as if fully set forth herein.

BACKGROUND

Verifying a particular type or brand of machinery can be beneficial. As an example, verifying a type of transportation device can be beneficial to issuers of insurance policies and other service providers. Using specialized sensors or devices to perform the verification adds additional costs and complications for a user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
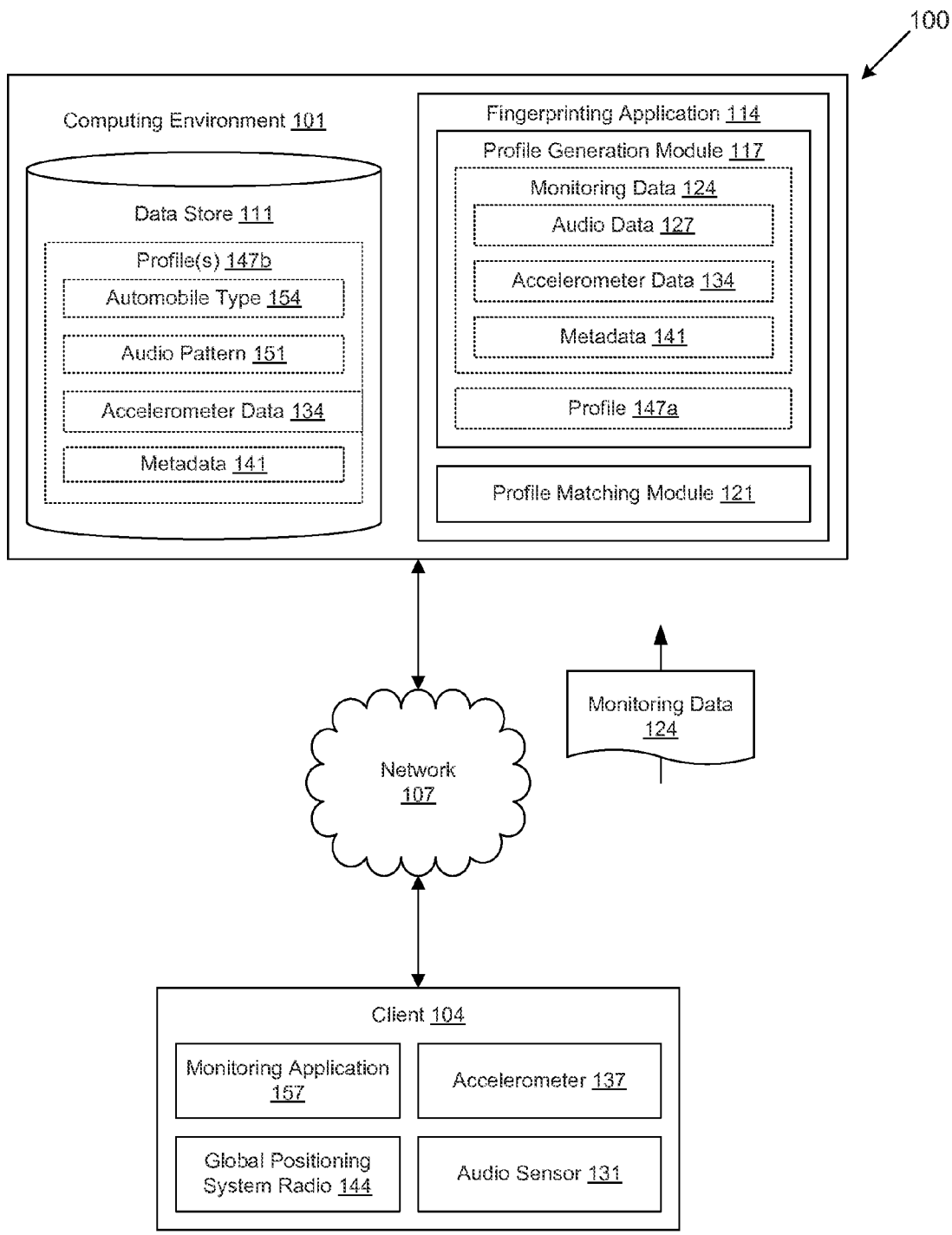
FIG. 1 is a drawing of a networked environment according to various embodiments of the present disclosure.

Insurance policies for transportation devices are often issued for a particular transportation device owned by a customer. The terms and conditions of an insurance policy may be dependent on the type of transportation device covered by the policy. For example, an insurance policy for a vehicle known to have greater safety risks may require a higher premium when compared to a policy for a lower risk vehicle. The terms and conditions of the insurance policy may also be dependent on driving habits of a user. The policy issuer may offer incentives for customers who drive a limited distance, limit their driving speed to a predefined limit, or maintain their vehicles in proper working condition.

Monitoring the type, operation, and condition of a vehicle may be performed by implanting proprietary sensors into the vehicle. This comes at a financial cost to either the insurance company or the customer to cover the cost of the sensors and their installation. Additionally, a customer may be discouraged from installing the sensors for fear of impacting the vehicle's performance, or reducing the resale value of the vehicle.

By using sensors commonly available in mobile devices such as mobile phones, a fingerprinting application can obtain data to generate a profile comprising a pattern. The fingerprinting application can then determine if the customer vehicle corresponds to the vehicle covered by the policy by comparing the pattern from the obtained data to a pattern known to correspond to the covered vehicle. In an aspect, the data can include audio data and the fingerprinting application can be used to obtain audio data from a vehicle for comparison. One or more audio patterns from the audio data can be used to determine a corresponding vehicle or type of vehicle by selecting the nearest matching profile from a pool of known audio patterns.

Other data such as accelerometer data, location data, and weather information can be used for comparison or to better select a known given data pattern such as an audio pattern, for comparison, or used as input to an algorithm comparing the patterns. Thus, for example, accelerometer data can be obtained providing a vibration pattern for comparison to one or more known vibration patterns. The accelerometer data may be used alone for comparison, or in combination with other data such as audio data for comparison and identification or verification. Weather data can be used to better select known audio, accelerometer and/or other patterns for comparison. The known patterns may include data of a known make and/or model vehicle in both wet and dry conditions. Weather data, or other data, may be used to select either the known wet or dry data for comparison to that obtained from the vehicle.

In an aspect, the fingerprinting application can be used to discriminate between vehicles in a multi-vehicle household. In the case of a household having more than one vehicle, the application can be used to determine which one of the vehicles in the household a person is currently driving or in which the person is riding. For example, when using the sensor or sensors in a mobile phone, the application can be used to determine which one of the vehicles in the household a person's mobile phone is present in at a given time, and by inference the vehicle a person is currently driving or in which the person is riding. The application may also be used in connection with a fleet of vehicles to determine which one of a fleet of vehicles is currently driven or in which the person is riding.

Additionally the fingerprinting application may be operable to determine the operating condition of a vehicle or generate operator behavior patterns as a function of the obtained data. A vehicle may be, but is not limited to, an automobile, a truck, a tractor, a motorcycle or an all-terrain vehicle (ATV), or for example any other vehicle of the type that may be covered by insurance.

Although the following discussion is presented in the context of using the fingerprinting application to perform identification, diagnostics, or operator evaluations related to vehicles, and in particular an automobile, it is understood that the following approaches are not limited an automobile or even to vehicles. The discussion may apply to any type of motorized transportation device. For example, it may also apply to water and air transportation devices such as, but not limited to, boats, yachts, personal watercraft (PWC), airplanes or any other type of water or air transportation devices that may be covered by insurance. Furthermore, it may also be applied to any type of machinery that produces audible, vibration, motion, orientation and/or acceleration data.

In the following discussion, a general description of the system and its components is provided, followed by a discussion of the operation of the same.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system or device providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data store can be anywhere on any one or more storage devices in the environment 100 and accessible to or by the computing environment 101. The data stored in the data store 111, for example, is associated with the operation of the various applications and/or functional entities described below.

The components executed on the computing environment 101, for example, can include a fingerprinting application 114 having a profile generation module 117 and a profile matching module 121, and other applications, services, processes, systems, engines, or functionality not discussed in detail herein. The fingerprinting application 114 is executed to obtain monitoring data 124 from a client 104.

For example, the monitoring data 124 may comprise audio data 127 recorded from an operational automobile by an audio sensor 131 of the client 104, and the fingerprinting application can be an audio fingerprinting application. The monitoring data 124 may also comprise accelerometer data 134 captured by an accelerometer 137 of the client 104 during an operation of an automobile. The accelerometer data 137 may be indicative of acceleration patterns of the associated automobile. The accelerometer data 137 may also be used to determine a vibration pattern of the automobile as transferred to the client 104 which captured the accelerometer data 137. Other types of vibration sensors may also be used to obtain vibration data. The monitoring data can also include movement data, orientation data, location data, or other data representative of a piece of machinery such as an automobile. Other sensors may thus be used to obtain such monitoring data, for example a magnetometer, a gyroscope, a global positioning device or sensor.

A smart mobile device may be used for sensing or obtaining the monitoring data 124. Examples of a suitable smart mobile device include smart mobile phones, tablets, personal digital assistants (PDA's), or other portable devices with electronic processing capability. Such devices may include any one or more sensors for sensing a characteristic of the machinery to be monitored such as an automobile. For example, such devices may include one or more sensors such as an audio, motion, vibration, orientation and location sensors.

The monitoring data 124 may also comprise additional metadata 141 embodying the context in which the client 104 was monitoring the operational automobile. The metadata 141 may comprise global positioning system (GPS) data captured by a GPS radio 144 of the client 104 or other type of location sensor or system. For example, location may be determined by use of cell tower data and tower triangulation, involving a data source and/or a backend system apart from a location sensor.

The metadata 141 may also comprise data encoding weather conditions, barometric pressure, speed, or other contextual data related to the operation of the automobile. Additionally, the metadata 141 may include information such as deviations of the automobile from the factory default standards, including additional hardware components, hardware modifications, and other data.

The profile generation module 117 generates a profile 147a from the monitoring data 124. The profile 147a comprises data to facilitate the matching of an automobile associated with the monitored data 124 captured by a client 104 to a corresponding profile 147b sharing a like vehicle make, model, or other criteria. For example, the monitored data 124 may comprise audio data and the profiles 147a/b may comprise an audio pattern 151 generated as a function of audio data 127 of the monitoring data 124. The audio pattern 151 may embody a frequency pattern, minimum or maximum frequency, amplitude range, or other values associated with captured audio data 127. The profiles 147a/b may also comprise metadata 141 generated as a function of metadata 141 included in the monitoring data 124.

In some embodiments, generating the profile 147a comprises applying a filter to the audio data 127 to eliminate noise, or to isolate particular sources or characteristics of the audio data 127. For example, a filter may be applied to isolate audio data 127 embodying sounds generated by the tires, transmission, or engine of the corresponding automobile. A filter may be applied to isolate audio data 127 embodying sounds that fall within specified parameters for amplitude, duration, or frequency. In other embodiments, generating the profile 147a comprises isolating audio data 127 into subsets of audio data 127, each corresponding to multiple audio patterns 151 included in the profile 147a. For example, the profile generation module 117 may isolate from the monitoring data 124 audio data 127, tire audio data 127, transmission audio data 127, and/or engine audio data 127, or any combinations of such data. In such an example, the profile generation module 117 may then generate a tire audio pattern 151, a transmission audio pattern 151, or an engine audio pattern 151, or any combination of such patterns from their respective audio data 127 for inclusion in the profile 147a.

In other embodiments, the profile generation module 117 may perform transformations to the audio data 127 or the audio pattern 151 as a function of the metadata 141. For example, the metadata 141 may comprise data indicating a greater barometric pressure during the time in which the monitoring data 124 was captured, the profile generation module 117 may apply a transformation to the audio data 127 or an audio pattern 151 to normalize the audio data 127 and/or audio pattern 151 relative to a known barometric pressure corresponding to the profiles 147b to which the generated profile 147a will be compared.

The profiles 147a/b may also comprise an automobile type 154 indicating a corresponding automobile from which the profile 147a was generated. The automobile type 154 may comprise a vehicle identification number (VIN), data embodying a year, make, and model of an automobile, or other data. Generating the profile 147a may also be performed by another approach.

The profile matching module 121 matches the profile 147a generated from the monitoring data 124 to one or more profiles 147b accessible to the computing environment 101. This may be facilitated by any matching algorithm or pattern matching algorithm as can be appreciated. In the case of audio data 127, this may be facilitated by any known audio matching algorithm or pattern matching algorithm.

Known profiles 147b may be specifically developed for use by the fingerprinting application or may be captured from publicly available sources such as the Internet. The known profiles 147b may be stored locally within the environment of the present system or remotely (for example in a cloud—based system) or simply obtained by searching or crawling publicly available data bases.

In some embodiments, the profile matching module 121 may attempt to match the generated profile 147a to a known profile 147b in order to determine if an automobile claimed under an insurance policy and corresponding with the known profile 147b matches the automobile from which the monitoring data 124 was generated. In such an embodiment, the profile matching module 121 may select a subset of known profiles 147b corresponding to the automobile type 154 to which the generated profile 147a will be matched. The matching may involve a criterion of similarity.

In an embodiment, as a criterion of similarity the profile matching module 121 may calculate a degree of similarity between a generated profile 147a and one or more selected known profiles 147b. This may comprise calculating a score generated as a function of a degree to which the audio patterns 151 match or a degree to which the metadata 141 matches, or both. This may comprise generating a variance or a measure of variance between the generated profile 147a and at least one of the known profiles 147b. The profile matching module 121 may determine that the generated profile 147a matches an automobile type 154 associated with at least one of the selected known profiles 147b as a function of the variance or degree of match. The determination may be responsive to the score exceeding a threshold. The profile matching module 121 may also determine if the generated profile 147a corresponds to a defined automobile type 154 by another approach.

In other embodiments, the profile matching module 121 may attempt to determine a corresponding automobile type 154 for a generated profile 147a. In such an embodiment, the profile matching module 121 may calculate a degree of similarity or a probability of similarity with the entirety or a subset of known profiles 147b accessible to the computing environment 101. This may comprise calculating a score generated as a function of a degree to which the audio patterns 151 match or a degree to which the metadata 141 matches. The profile matching module 121 would then determine the monitoring data 124 was generated from an automobile whose automobile type 154 is embodied in the known profile 147b having the highest score with respect to the generated profile 147a. The generated profile 147a may be generated from any of the monitored data mentioned herein. For example, the generated profile 147a may comprise any one or more of audio data 127, accelerometer data 134, vibration data, movement data, or location data. The known profile 147b may consist of any one or more known profiles 147b corresponding to the monitoring data 124 from which the generated profile 147a is developed.

In some embodiments, the profiles 147b may be embodied in a knowledge base for use in a supervised machine learning algorithm applying any known supervised machine learning technique, such as but not limited to a support vector machine (SVM). In such an embodiment, the profile matching module 121 may apply the supervised machine learning algorithm to the generated profile 147a and the knowledge base of profiles 147b to determine a matching profile 147b.

Additionally, the profile matching module 121 may use metadata 141 or accelerometer data 134 of the monitoring data 124 to narrow the scope of known profiles 147b to which the generated profile 147a will be matched. For example, in embodiments in which the metadata 141 or the monitoring data 124 indicates that audio data 127 was captured during rainy weather or other conditions, the profile matching module 121 may narrow the scope of profiles 147b for matching to those profiles 147a whose audio patterns 151 were generated from audio data 127 captured under similar conditions. As another example, the profile matching module 121 may narrow the scope of the profiles 147b to those profiles 147b whose accelerometer data 134 is similar to that of the monitoring data 124.

The profile matching module 121 may also use the metadata 141 or accelerometer data 134 of the monitoring data 124 to, during a matching process, assign a higher weight to those profiles 147b having similar or matching metadata 141 or accelerometer data 134 to that of the monitoring data 124. The profile matching module 121 may also use metadata 141 or accelerometer data 134 by another approach.

In some embodiments, the profile matching module 121 may determine a variance between the audio pattern 151 of the generated profile 147a and a known matching profile 147b to generate a diagnostic of the automobile to which the generated profile 147a corresponds. For example, an audio pattern 151 of a generated profile 147a having periodic spikes in amplitude not found in an audio pattern 151 of a matching profile 147b may indicate improper engine functionality such as a misfiring cylinder or other malfunction. In some embodiments, the profile matching module 121 may generate diagnostics as a function of noise or other audio data 127 filtered by the profile generation module 117 or other functionality of the fingerprinting application 114, and match the filtered audio data 127 to known diagnostic issues. The profile matching module 121 may also generate diagnostics by another approach.

The data stored in the data store 111 includes, for example, profiles 147b having one or more of an automobile type 154, audio pattern 151, accelerometer data 134, and metadata 141, and potentially other data. The profiles 147b may be stored in a relational database, in a supervised machine learning knowledge base, or in another data structure as can be appreciated.

The client 104 is representative of a plurality of client devices that may be coupled to the network 107. The client 104 may comprise, for example, a processor-based system such as a computer system. Such a computer system may be embodied in the form of, a laptop computer, personal digital assistants, cellular telephones, smartphones, music players, web pads, tablet computer systems, electronic book readers, or other mobile devices with electronic processing capability. Although the client 104 comprises a smartphone in a preferred embodiment, it is understood that the client 104 may comprise any device with like capability.

The client 104 may be configured to execute various applications such as a monitoring application 157 and/or other applications. The monitoring application 157 is executed to generate monitoring data 124 during the operation of an automobile. This may comprise, for example, accessing an audio sensor 131 implemented in the client 104 or in communication with the client 104 to generate audio data 127. The audio sensor 131 may comprise a microphone, speaker phone, voice recorder, or other device capable of encoding audio signals. In some embodiments, the monitoring application 157 may remotely access an audio sensor 131 external to the client 104 to generate the audio data 127. For example, the monitoring application 157 may communicate with an audio sensor 131 installed in an automobile to facilitate voice controls for automobile functionality or services. The monitoring application 157 may communicate with the external audio sensor 131 via wired or wireless communications. The monitoring application 157 may also generate the audio data 127 by another approach.

The monitoring application 157 may also encode accelerometer data 134 for the monitoring data 124 by accessing an accelerometer component of the client 104 or an external accelerometer 137 as can be appreciated. Additionally, the monitoring application 157 may encode GPS data can into the metadata 141 of the monitoring data 124 by accessing a GPS radio 144 incorporated into the client 104 or by remotely accessing an external GPS radio 144. Metadata 141 such as traversed terrain, behavior patterns, and speed may also be generated as a function of the GPS metadata 141 by communicating with additional services, accessing stored map or terrain data, or by another approach. The monitoring application 157 may also accept user input for additional metadata 141 such as an automobile hardware configuration, operational or maintenance information, or other data.

The monitoring application 157 also facilitates the communication of monitoring data 124 to the fingerprinting application 114. The monitoring data 124 may be communicated responsive to user input, at a predefined interval, or at a predefined time. The monitoring application 157 may also restrict generation or communication of monitoring data to predefined conditions, such as the client 104 being connected to a power supply, or other conditions. The conditions may be predefined by the monitoring application 157 or defined as a user preference.

Figure 2:
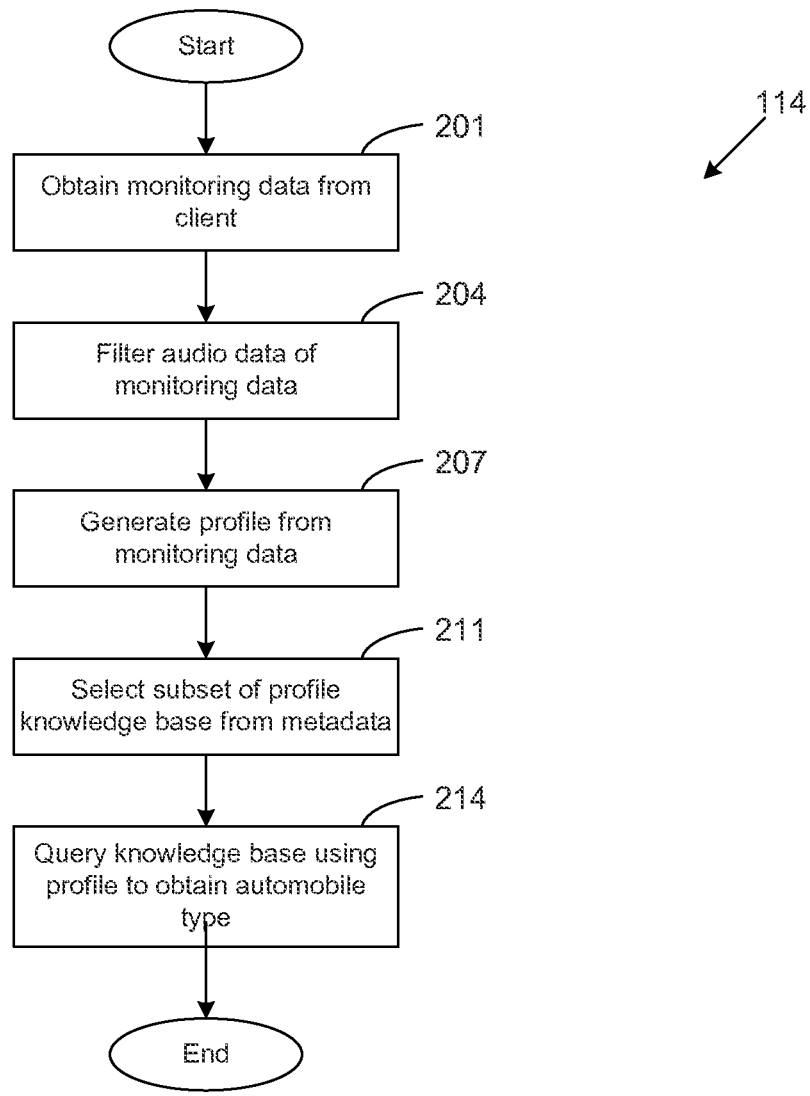
FIG. 2 is a flowchart illustrating one example of functionality implemented as portions of a fingerprinting application executed in a computing environment in the networked environment of FIG. 1 according to various embodiments of the present disclosure.

Referring next to FIG. 2, shown is a flowchart that provides one example of the operation of a portion of the fingerprinting application 114 (FIG. 1) according to various embodiments. It is understood that the flowchart of FIG. 2 provides merely an example of the many different types of functional arrangements that may be employed to implement the operation of the portion of the fingerprinting application 114 as described herein. As an alternative, the flowchart of FIG. 2 may be viewed as depicting an example of steps of a method implemented in the computing environment 101 (FIG. 1) according to one or more embodiments.

Beginning with box 201, the fingerprinting application 114 obtains monitoring data 124 (FIG. 1) via a network 107 (FIG. 1) from a client 104 (FIG. 1) executing a monitoring application 157 (FIG. 1). Next, in box 204, the profile generation module 117 (FIG. 1) performs the optional step of filtering the audio data 127 (FIG. 1) of the monitoring data 124 (FIG. 1). In some embodiments, this comprises filtering noise or distortion from the audio data 127. In other embodiments, this comprises filtering the audio data 127 to extract a distinct subset of the audio data 127 generated from a desired source, such as an engine, tires, or transmission. For example, a filter may be applied to isolate audio data 127 embodying sounds that fall within specified parameters for amplitude, duration or frequency. Filtering the audio data 127 may also be performed by another approach.

The profile generation module 117 then generates a profile 147a (FIG. 1) from the monitoring data 124 in box 207. This may comprise generating an audio pattern 151 (FIG. 1) to facilitate a pattern matching algorithm applied to match profiles 147b (FIG. 1). The audio pattern 151 may comprise a frequency pattern, frequency range, amplitude range, or other values generated as a function of the audio data 127, or a combination of two or more of such values. Generating the profile 147a may also comprise, but need not, including the accelerometer data 134 (FIG. 1) or metadata 141 (FIG. 1) of the monitoring data 124 in the generated profile 147a.

Additionally, generating the profile 147a may comprise generating additional metadata 141 as a function of the metadata 141 of the monitoring data 124. For example, the profile generation module 117 may generate one or more of speed, terrain, or weather metadata using GPS metadata 141 of the monitoring data 124. The generating the metadata 141 may be facilitated by communicating with a third-party service or accessing additional functionality implemented in the computing environment 101. For example, the profile generation module 117 may communicate with a weather data service to determine a weather condition for the GPS metadata 141 at the time the monitoring data 124 was captured. Metadata 141 may also be generated by another approach.

After the profile 147a has been generated by the profile generation module 117, the profile matching module 121 (FIG. 1) selects a subset of a knowledge base of profiles 147b (FIG. 1) to which the generated profile 147a will be matched. This may be, but need not be, as a function of the metadata 141 of the generated profile 147a. In some embodiments, this may comprise selecting those profiles 147b having a number of matching metadata 141 elements exceeding a threshold, or having metadata 141 within a defined deviation range. For example, if the metadata 141 of the generated profile 147a comprises data embodying a weather condition, the profile matching module 121 may select those of the knowledge base profiles 147b having metadata 141 embodying similar or matching weather conditions. The profile matching module 121 may also select a subset of a knowledge base of profiles 147b using metadata 141 by another approach.

Next, in box 214, the profile matching module 121 queries the subset of the knowledge base of profiles 147b to obtain an automobile type 154 (FIG. 1) for the generated profiles 147a. This may comprise, for example, applying a supervised machine learning algorithm to one or more generated profiles 147a and the knowledge base to obtain a matching profile 147b. The generated profile 147a would then be assigned an automobile type 154 of the matching profile 147b. Other approaches may also be used to obtain an automobile type 154 for the generated profile 147a.

Figure 3:
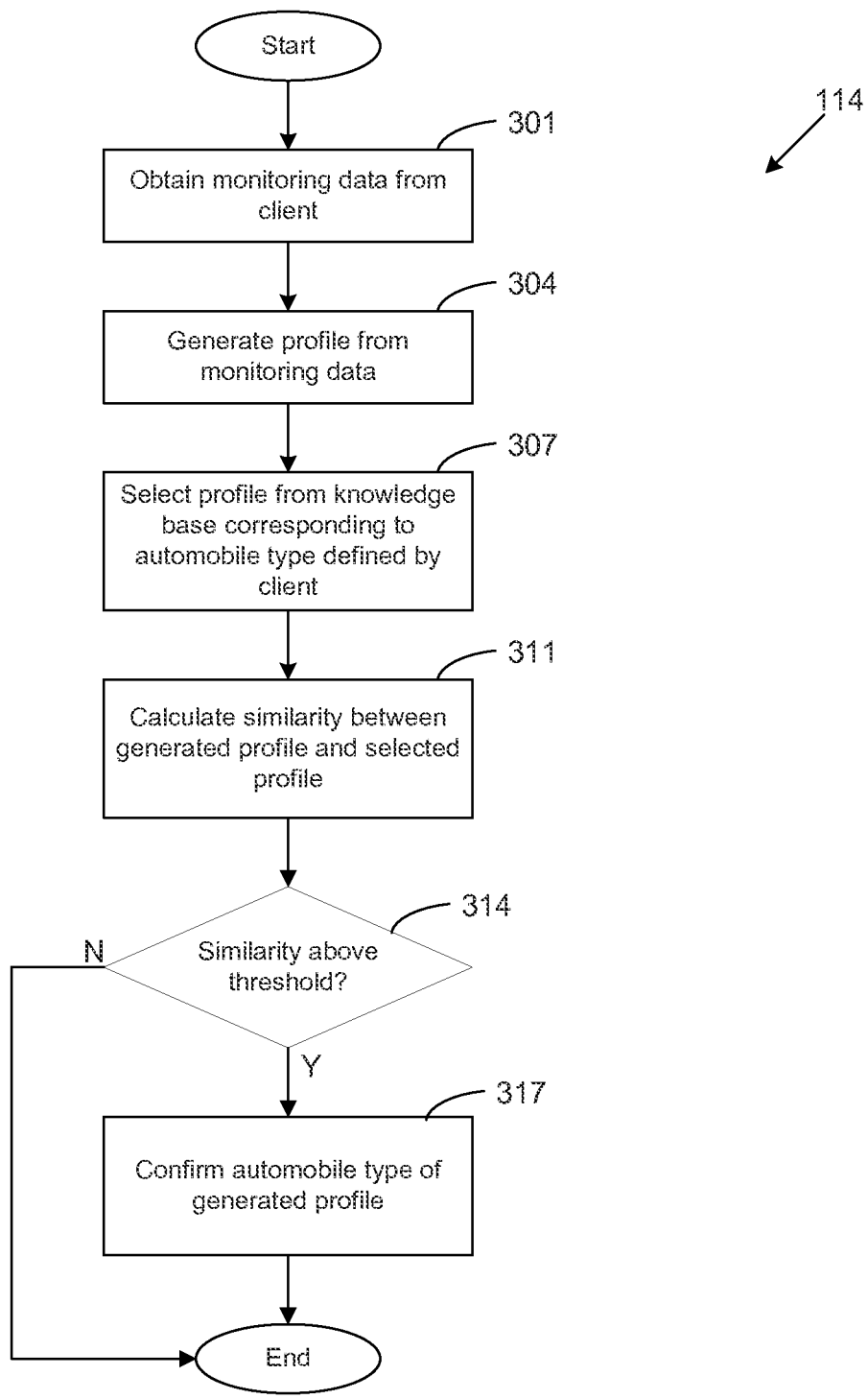
FIG. 3 is a flowchart illustrating one example of functionality implemented as portions of a fingerprinting application executed in a computing environment in the networked environment of FIG. 1 according to various embodiments of the present disclosure.

Referring next to FIG. 3, shown is a flowchart that provides one example of the operation of a portion of the fingerprinting application 114 (FIG. 1) according to various embodiments. It is understood that the flowchart of FIG. 3 provides merely an example of the many different types of functional arrangements that may be employed to implement the operation of the portion of the fingerprinting application 114 as described herein. As an alternative, the flowchart of FIG. 3 may be viewed as depicting an example of steps of a method implemented in the computing environment 101 (FIG. 1) according to one or more embodiments.

Beginning with box 301, the fingerprinting application 114 obtains monitoring data 124 (FIG. 1) via a network 107 (FIG. 1) from a client 104 (FIG. 1) executing a monitoring application 157 (FIG. 1). The monitoring data 124 is associated with an automobile type 154 (FIG. 1) indicated by the client 104. Next, in box 304, profile generation module 117 then generates a profile 147a (FIG. 1) from the monitoring data 124. This may comprise, for example, obtaining monitored audio data 127 (FIG. 1) and generating an audio pattern 151 (FIG. 1)

to facilitate a pattern matching algorithm applied to match profiles 147b (FIG. 1). The audio pattern 151 may comprise a frequency pattern, frequency range, amplitude range, or other values generated as a function of the audio data 127. Generating the profile 147a may also comprise including the accelerometer data 134 (FIG. 1) or metadata 141 (FIG. 1) of the monitoring data 124 in the generated profile 147a.

Additionally, generating the profile 147a may comprise generating additional metadata 141 as a function of the previously obtained or generated metadata 141 of the monitoring data 124. For example, the profile generation module 117 may generate one or more of speed, terrain, or weather metadata using GPS metadata 141 of the monitoring data 124. The generation of the metadata 141 may be facilitated by communicating with a third-party service or accessing additional functionality implemented in the computing environment 101. For example, the profile generation module 117 may communicate with a weather data service to determine a weather condition for the GPS metadata 141 at the time the monitoring data 124 was captured. Metadata 141 may also be generated by another approach.

After the profile 147a has been generated by the profile generation module 117, the profile matching module 121 (FIG. 1) selects at least one profile 147b from a knowledge base whose automobile type 154 corresponds to the automobile type 154 associated with the monitoring data 124. Selecting the at least one profile 147b may optionally be performed as a function of metadata 141.

In some embodiments, this may comprise selecting those profiles 147b having a number of matching metadata 141 elements exceeding a threshold, or having metadata 141 within a defined deviation range. For example, if the metadata 141 of the generated profile 147a comprises data embodying a weather condition, the profile matching module 121 may select those of the knowledge base profiles 147b having metadata 141 embodying similar or matching weather conditions. The profile matching module 121 may also select a subset of a knowledge base of profiles 147b using metadata 141 by another approach.

The profile matching module 121 then calculates a similarity between the generated profile 147a and the selected known profiles 147b. This may comprise calculating a score as a function of a degree to which audio patterns 151 of the generated profiles 147a and known profiles 147b overlap. The score may also be calculated as a function of a degree to which the accelerometer data 134 or metadata 141 are similar. The score may also be calculated by another approach.

As an example, in box 314, if the similarity score between the generated profile 147a and at least one of the selected known profiles 147b exceeds a threshold, the process proceeds to box 317 in which the generated profile 147a is confirmed to have the same automobile type 154 as the selected profiles 147a, after which the process ends. Otherwise, the process ends without confirming the automobile type 154 of the generated profile 147a. Other modes for determining similarity other than by application of a threshold can also be used.

Figure 4:
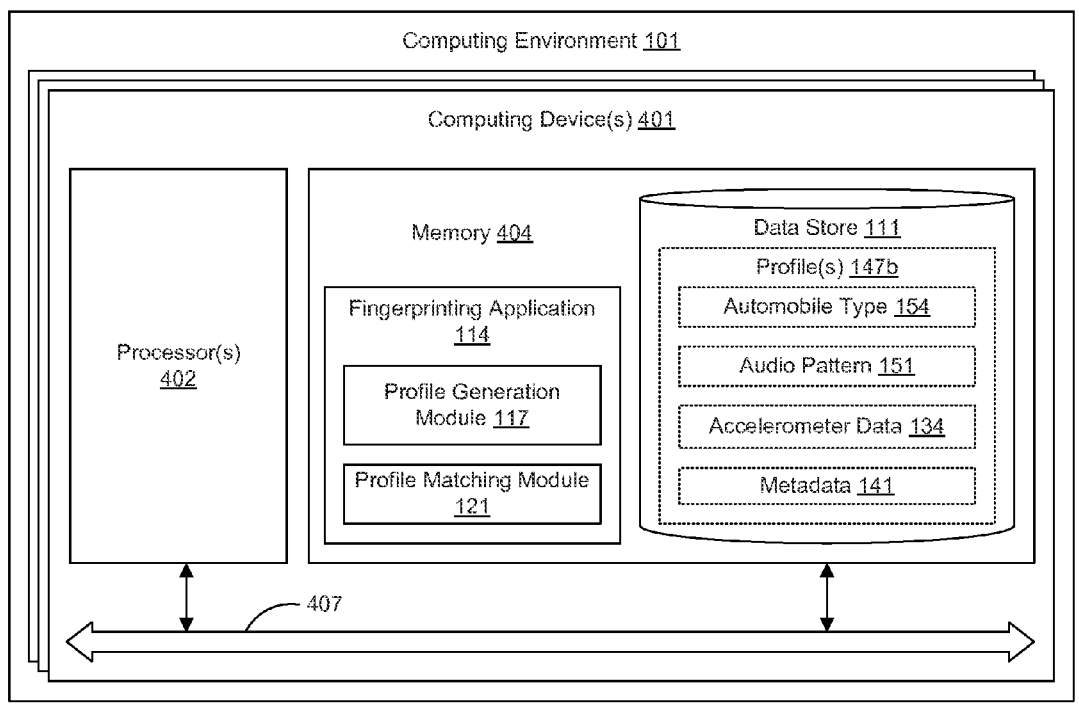
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are an fingerprinting application 114 having a profile generation module 117 and a profile matching module 121, and potentially other applications. Also stored in the memory 404 may be a data store 111 storing profiles 147b comprising an automobile type 154, an audio pattern 151, accelerometer data 134 and metadata 141, and other data. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one or more of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the fingerprinting application 114, and other various systems described herein may be embodied in software or code executed by general purpose hardware as discussed above, as an alternative the same may also be embodied in dedicated hardware or a combination of software/ general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the fingerprinting application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fingerprinting application 114, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   a fingerprinting application executable in the at least one computing device, the fingerprinting application comprising:
   logic that obtains, from a mobile device, data generated by a motorized transportation device resulting from operation of the motorized transportation device;
   logic that generates a profile as a function of the generated data; and
   logic that determines whether the profile corresponds to at least one of a plurality of known profiles, each of the known profiles being associated with a particular motorized transportation device or type of motorized transportation device.

2. The system of claim 1, wherein the logic that determines further comprises:
   logic that selects at least one of the known profiles;
   logic that calculates a similarity between the generated profile and the selected at least one of the known profiles; and
   wherein the determination is responsive to a criterion of similarity.

3. The system of claim 1, the fingerprinting application further comprising:
   logic that applies a filter to the data to generate a plurality of data subsets; and
   wherein the profile and known profiles comprise data associated with each of the data subsets.

4. The system of claim 1, the fingerprinting application further comprising logic that applies a filter to the data to remove at least a portion of the data before generating the profile.

5. The system of claim 1, the system further comprises a data store storing a knowledge base of the known profiles, and wherein the logic that determines further comprises logic that applies a supervised machine learning algorithm to the profile and the known profiles.

6. The system of claim 1, wherein the fingerprinting application further comprises:
   logic that obtains metadata associated with the data; and wherein the determining is performed as a function of the metadata.

7. The system of claim 6, wherein the metadata comprises at least one of location data of the mobile device, a weather condition, or a speed of the motorized transportation device at a time the data was generated.

8. The system of claim 1, wherein fingerprinting application further comprises:
   logic that obtains data from the mobile device, the data selected from the group consisting of audio data, accelerometer data, vibration data, and combinations thereof; and
   wherein the determining is performed as a function of the data.

9. The system of claim 1, wherein the fingerprinting application further comprises:
   logic that, responsive to the determination, generates a variance or a measure of variance between the generated profile and a corresponding at least one of the known profiles; and
   logic that generates a performance diagnosis for the motorized transportation device as a function of the variance or the measure of variance.

10. The system of claim 1, wherein the motorized transportation device is a vehicle, and the fingerprinting application further comprises:
    logic that obtains a vehicle identification number (VIN) for the vehicle;
    logic that obtains a vehicle configuration as a function of the VIN; and
    wherein the determining is performed as a function of the vehicle configuration.

11. A method, comprising the steps of:
    obtaining, by a computing device, from a mobile device, data comprising data generated by a motorized transportation device resulting from operation of the motorized transportation device;
    generating, by the computing device, a profile as a function of the generated data; and
    determining, by the computing device, whether the profile corresponds to at least one of a plurality of known profiles, each of the known profiles being associated with a particular motorized transportation device or type of motorized transportation device.

12. The method of claim 11, wherein the step of determining further comprises:
    selecting, by the computing device, at least one of the known profiles;
    calculating, by the computing device, a similarity between the generated profile and the selected at least one of the known profiles; and
    wherein the determination is responsive to meeting a criterion of similarity.

13. The method of claim 11, further comprising the steps of:
    applying, by the computing device, a filter to the data to generate a plurality of data subsets; and
    wherein the profile and known profiles comprise data associated with each of the data subsets.

14. The method of claim 11, further comprising the step of applying a filter to the data to remove at least a portion of the data before generating the profile.

15. The method of claim 11, further comprising:
    maintaining, by the computing device, a knowledge base of the known profiles; and
    wherein the step of determining further comprises applying a supervised machine learning algorithm to the profile and the known profiles.

16. The method of claim 11, further comprising:
    obtaining, by the computing device, metadata associated with the data; and
    wherein the determining is performed as a function of the metadata.

17. The method of claim 16, wherein the metadata comprises at least one of location data of the mobile device, a weather condition, or a speed of the motorized transportation device at a time the data was generated.

18. The method of claim 11, further comprising:
    obtaining, by the computing device, data from the mobile device the data selected from the group consisting of audio data, accelerometer data, vibration data, and combinations thereof; and
    wherein the step of determining is performed as a function of the data.

19. The method of claim 11, further comprising:
    generating, by the computing device, responsive to the determination, a variance or a measure of variance between the generated profile and a corresponding at least one of the known profiles; and
    generating, by the computing device, a performance diagnosis for the motorized transportation device as a function of the variance or the measure of variance.

20. The method of claim 11, wherein the motorized transportation device is a vehicle and the method further comprises:
    obtaining, by the computing device, a vehicle identification number (VIN) for the vehicle;
    obtaining, by the computing device, a vehicle configuration as a function of the VIN; and
    wherein the determining is performed as a function of the vehicle configuration.

* * * * *